CONTINUOUS VIDEO PEAKING CONTROL CIRCUIT

Filed May 20, 1966

INVENTORS
JOHN F. SLUSARSKI &
JOHN A. KONKEL
BY Eugene M. Whitacre
Attorney

United States Patent Office 3,461,234

Patented Aug. 12, 1969

3,461,234

CONTINUOUS VIDEO PEAKING CONTROL CIRCUIT

John F. Slusarski and John A. Konkel, Indianapolis, Ind., assignors to RCA Corporation, a corporation of Delaware Filed May 20, 1966, Ser. No. 551,666
Int. Cl. H04n 5/44
U.S. Cl. 178—7.5 8 Claims

ABSTRACT OF THE DISCLOSURE

A peaking control circuit has a series peaking coil coupled between the source of video signals and a video load. An inductor and a resistor are connected in series between the source of signals and ground, the resistor having an adjustable tap to which a terminal of a capacitor is connected. The capacitor having another terminal connected to said resistor. The capacitor and inductor are series resonant near the low end of the frequency range of the video signals. By varying the setting of the tap, the amount of peaking in the signal applied to the input of the amplifier may be continuously varied.

This invention relates to television receivers, and more particularly, to a continuous video peaking control circuit for television receivers.

An object of the present invention is to provide an improved video peaking control circuit for television receivers.

Another object of the present invention is to provide a manually adjustable continuous video peaking control circuit for television receivers having a wide range of control from slight black smear to crisp overshoots.

The terms "smear," "overshoot" and "ringing" are commonly used in the description of the transient response of video amplifiers in response to a stepped input wave. Smear may be characterized by a relatively slow rise time in approaching a steady state level. Overshoot denotes a relatively fast rise time with output signal amplitude exceeding or "overshooting" the steady state level. Ringing refers to an oscillatory approach to the final steady state level.

A video peaking control circuit in accordance with one embodiment of the invention comprises a coupling network between a source of video signals and a video amplifier. The coupling network includes a series peaking inductor providing a first current path between the source of video signals and the video amplifier. A second current path is provided from the video signal source and a point of reference potential including the series combination of an inductor and a resistor having an adjustable tap. A capacitor is connected between one terminal of the resistor and the tap. The capacitor and the inductor in the second current path are broadly resonant near the low frequency end of the video frequency band so that a greater percentage of low frequency signal energy as compared to higher frequency signal energy is developed across the capacitor. The signal energy developed across the capacitor is applied to the video amplifier to maintain the low frequency drive to the amplifier substantially constant as the tap is adjusted between limit positions while the high frequency drive to the amplifier is varied over a substantial range corresponding to maximum and minimum peaking conditions.

The novel features that are considered characteristic of this invention are set forth with particularity in the appended claims. The invention itself, however, both as to its organization and method of operation as well as additional objects and advantages thereof will best be understood from the following description when read in connection with the accompanying drawing in which:

Figures 1, 2, 3:
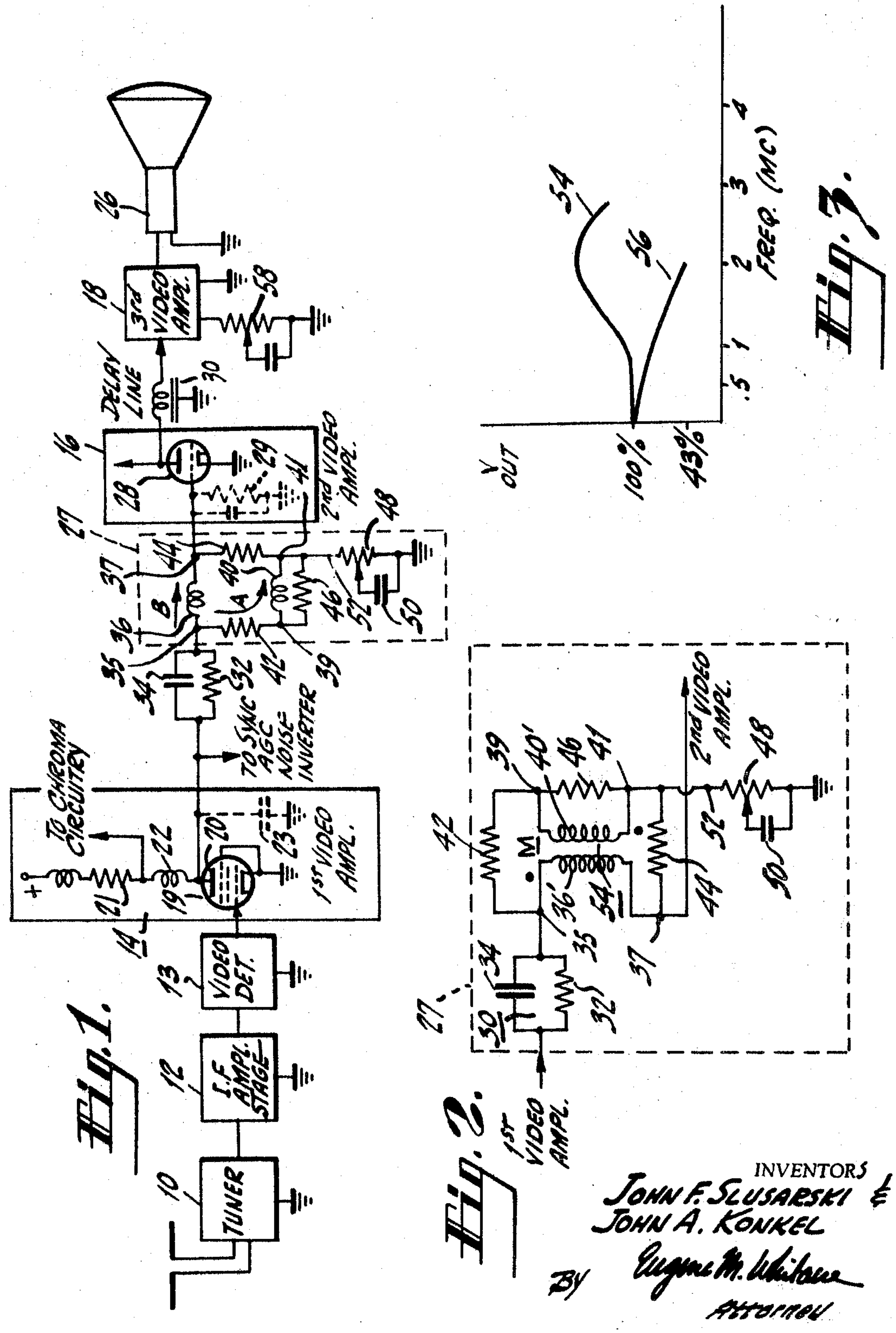
FIGURE 1 is a schematic circuit diagram of a portion of a television receiver, partly in block form, which includes a peaking control circuit embodying the invention.
FIGURE 2 is a schematic circuit diagram of a modification of the peaking contro circuit shown in FIGURE 1.
FIGURE 3 is a graph of the video signal response of an amplifier system including the peaking control circuit of FIGURE 1.

FIGURE 1 is a partial block diagram of a color television receiver including the usual tuner 10, IF amplifier 12, and video detector 13. As shown, the receiver includes three video amplifier stages 14, 16 and 18 in the luminance channel. The amplifier stage 14 amplifies the composite television signal from the video detector 13, and is coupled to drive the synchronizing signal separator, AGC noise inverter circuitry and chrome circuitry, not shown. The portions of the television receiver circuitry not shown may be of the type used in the CTC–17X television chassis, manufactured by RCA, and shown in RCA Victor Color Television Service Data; File: 1965 No. 12; available from RCA Sales Corporation, 600 N. Sherman Drive, Indianapolis, Ind.

The first video amplifier 14 includes a pentode 19 having an anode 20 with a capacitance to ground represented by the dotted capacitor 23. The output of the first video amplifying stage 14 is coupled to the second video amplifying stage 16 via a coupling network 27 which includes a video peaking network embodying the present invention. The amplifying stage 16 is a positively biased video amplifier including a triode amplifying tube 28 having a low input impedance (of the order of 500 ohms) represented by the dotted resistor 29. The amplifying stage 16 is coupled through a delay line 20 to the third video amplifying stage 18 which drives a kinescope 26.

Reference will now be made to the network intercoupling the first and second video amplifying stages 14 and 16. The anode 20 of the first video amplifying stage 14 is coupled through the parallel combination of a resistor 32 and capacitor 34 to the input terminal 35 of the coupling network 20. A series peaking inductor 36 is connected between the input terminal 35 and an output terminal 37 which is connected to the control electrode of triode 28. A resistor 42, inductor 40 and resistor 44 are connected in series between the input and output terminals 35 and 47, and a further resistor 46 is connected in parallel with the inductor 40. The resistors 42, 44 and 46 damp the inductors 36 and 40 to prevent ringing. A resistor 48 having an adjustable tap is connected between the junction of resistors 44 and 46 and ground, and a capacitor 50 is connected between the adjustable tap and ground. By manual adjustment of the tap on resistor 48, the high frequency peaking response of the circuit can be adjusted to suit the tastes of individual viewers. The resistor 48 may be remotely located with respect to the rest of the circuit such as on the front panel of the television receiver cabinet, without adversely affecting circuit operation.

In considering the operation of the video peaking conrtol circuit 27 it may be noted that the overall frequency response for maximum peaking may be achieved at several points in the video frequency amplifier channel including the stages 14, 16 and 18. Thus it is only necessary to describe the effects of the video peaking control circuit 27 on the overall frequency response of the composite video amplifier channel.

For purposes of explanation it may be presumed that the video signal source driving the network 27 is substantially a constant current source. Referring to FIGURE 1, the resistor 21, shunt peaking coil 22 and the anode capacitance 23 having an increasing impedance with frequency, while the resistor 32 and shunt capacitor 34 have a decreasing impedance with frequency. Although this may not provide exactly a constant current as a function of frequency it will be presumed that it does for purposes of explanation. The video peaking control network 27 may be regarded as having two primary current paths. The first path, represented by the arrow A, comprises the resistor 42, inductor 40 and resistor 48-capacitor 50 connected from the input terminal 35 to ground. The second path, represented by the arrow B, comprises the series peaking inductor 36 and the effective input impedance 29 of the positively biased video amplifier 16.

Consider first the operation of the network 27 with the tap on the resistor 48 at the grounded end thereof so that the capacitor 50 is effectively out of the circuit. For both high and low frequencies the first path represents a large impedance relative to the second path, and substantially all of the current from the constant current video signal source flows into the load represented by the input resistance 29 of the video amplifier 16. In the first path the resistor 48 is selected to have a large value relative to that of the input impedance 29 of the positively biased amplifier 16. Since substantially all of the current from the video signal source flows into the input impedance 29, there is very little selective attenuation of one frequency component relative to another so that the maximum peaking response designed into the overall video amplifier channel is achieved. This response may be represented by the curve 54 in the graph of FIGURE 3.

Next, consider the operation of the circuit with the tap on resistor 48 moved to the other terminal thereof so that the capacitor 50 is in parallel with the resistor 48. For high frequencies, such as of the order of two megacycles, the first path (arrow A) presents an impedance relative to the second path (arrow B) such that in a circuit using the parameters set forth hereinafter, less than half of the total current from the constant current video signal source flows through the load impedance 29.

For low frequencies the impedance of the first path is larger than that of the second path, and in a circuit using the parameters set forth hereinafter about two-thirds of the total low frequency current flows into the load 29 via the second path. However the first current path also contributes low frequency current to the load 29 by way of the resistor 44. To explain, the inductor 40 and capacitor 50 are resonant in the vicinity of the low frequency end of the video band, such as for example 700 kc. Thus a substantial low frequency voltage is developed across the capacitor 50. This voltage also appears across the resistor 44 in series with the load 29. In a circuit using the parameters set forth hereinafter the total low frequency current flowing through load impedance 29, by way of inductor 36 and resistor 44 is such that greater than 80% of the total current from the video frequency signal source flows through the load 29. The net result is that with the tap on resistor 48 at the upper end thereof, the high frequency peaking designed into the system is substantially counteracted by the coupling network while low frequencies are only slightly affected. The minimum peaking response is indicated by the curve 56 of FIGURE 3. With the tap on resistor 58 somewhere between the limit positions described above, the extent of high frequency video peaking lies somewhere between the curves 54 and 56 of FIGURE 3. By maintaining the low frequency response of the channel and avoiding a "saddle shaped" frequency response as indicated by the curve 56, "smear" is substantially avoided.

With the circuit described, the capacitor 50 is relatively isolated from the output terminal 37, and thereby reduces the susceptibility of the circuit to ringing which would result in black smears in the reproduced image. Furthermore, since the contrast control 58 is effectively isolated from the peaking control network, changes in the setting of the contrast control do not change the extent of the "overshoots."

A modification of the video peaking control circuit 27 is shown in FIGURE 2 wherein similar circuit components are designated by the same reference numerals as used in connection with FIGURE 1. The major difference between the peaking control networks of FIGURE 1 and FIGURE 2 is that in FIGURE 2 the inductors 36′ and 40′ are mutually coupled. The windings 36′ and 40′ are phased as indicated by the black dots on the diagram. Hence it can be seen that for minimum peaking settings of the tap on the resistor 48, the series resonance effect of the inductor 36′ and the capacitor 50 provide still another contribution to the low frequency current flowing through the load 29. This additional contribution is effected by virtue of the coupling of low frequency video signal components from the winding 36′ to the winding 40′ in a direction such that the low frequency currents resulting from such coupling are in the same direction as the currents through the first and second current paths noted above.

A video peaking control circuit as described provides continuous adjustment over the relatively large peaking range from slight black "smear" to crisp "overshoots," and gives the viewer a wide choice of the picture texture and eliminates most transmission ringing thereby improving the quality of the image presented on the kinescope.

The following figures represent the values of the components used in a preferred embodiment of the present invention:

| | | |
|---|---|---|
| Resistor 32 | | 47K |
| Resistor 42 | | 2.2K |
| Resistor 44 | | 4.7K |
| Resistor 46 | | 4.7K |
| Capacitor 34 | pfd | 3.5 |
| Coil 36 | μh | 330 |
| Inductor 40 | μh | 250 |
| Potentiometer 48 | | 25K |
| Capacitor 50 | pfd | 220 |
| Amplifying tube 28 | | ½6LF8 |
| Load 29 | | 500Ω |

What is claimed is:

1. In a television receiver including a source of video signals and a video load;
   - a video peaking control circuit including a series peaking coil coupled between said source of video signals and said video load,
   - an inductor and a resistor connected in series between said source of video signals and a point of reference potential, said resistor having an adjustable tap,
   - a capacitor connected between said tap and a point on said resistor, said capacitor and said inductor being series resonant near the low frequency end of the frequency range of said video signals, and
   - means for applying signals developed across said resistor and said capacitor to said load.

2. The combination as defined in claim 1 wherein said resistor is large relative to the input resistance to said video amplifier.

3. The combination as defined in claim 2 wherein the circuit path from said source of video signals through said series peaking coil to said video amplifier is of significantly less impedance to signals throughout the range of video frequencies than the circuit path from said source of video signals to said point of reference potential through said inductor and resistor when said adjustable tap is moved to said point, and
   - the impedance from said source of video signals through said peaking coil to said video amplifier is of greater impedance to video signals in the higher frequency portion of said range of video frequencies but of smaller impedance to video frequencies in the lower frequency portion of said range of video frequencies than the impedance of the circuit path from said source of video signals to said point of reference potential including said inductor and said resistor when said capacitor shunts a significant portion of said resistor.

4. A video peaking control circuit for coupling a substantially constant current source of video signals to a positively biased grid video amplifier comprising in combination:

an input terminal coupled to said source of video signals;

an output terminal coupled to the grid of said amplifier;

a series peaking coil connected between said input and output terminals;

a first resistor, an inductor and a second resistor connected in series between said input and output termianls;

a third resistor having a value which is large relative to the input resistance of said video amplifier, and having an adjustable tap thereon connected between the junction of said inductor and said second resistor and a point of reference potential;

a capacitor connected between said adjustable tap and a point on said third resistor, said capacitor selected to resonant with said inductor near the low frequency end of the range of video signals.

5. A video peaking control circuit as defined in claim 4 wherein said inductor and said capacitor are resonant at a frequency in the vicinity of 700 kilocycles.

6. A video peaking control circuit as defined in claim 4 including a fourth resistor connected in parallel with said inductor.

7. A video peaking control circuit as defined in claim 4 wherein said third resistor is physically located at a distance remote from the other elements of said video peaking control circuit.

8. A video peaking control circuit as defined in claim 4 wherein the circuit path from said source of video signals through said series peaking coil to said amplifier is of significantly less impedance to signals throughout the range of video frequencies than the circuit path from said source of video signals to said point of reference potential through said first resistor, said inductor and said third resistor when said adjustable tap is moved to said point, and the impedance from said source of video signals through said peaking coil to said amplifier is of greater impedance to video signals in the higher frequency portion of said range of video frequencies than the impedance of the circuit path from said source of video signals to said point of reference potential including said first resistor, said inductor and the combination of said capacitor and third resistor when said capacitor shunts a significant portion of said third resistor.

References Cited

UNITED STATES PATENTS

| | | |
|---|---|---|
| 2,514,112 | 7/1950 | Wright et al. |
| 2,615,089 | 10/1952 | Rogers. |
| 3,005,870 | 10/1961 | Ruby et al. |
| 3,320,361 | 5/1967 | Stroh. |

ROBERT L. GRIFFIN, Primary Examiner

ALFRED H. EDDLEMAN, Assistant Examiner